(12) United States Patent
Kang et al.

(10) Patent No.: US 12,530,928 B2
(45) Date of Patent: Jan. 20, 2026

(54) APPARATUS FOR CONTROLLING A VEHICLE AND A METHOD THEREOF

(71) Applicants: Hyundai Motor Company, Seoul (KR); Kia Corporation, Seoul (KR)

(72) Inventors: Tae Kyu Kang, Seoul (KR); Woo Sung Kim, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 241 days.

(21) Appl. No.: 17/861,344

(22) Filed: Jul. 11, 2022

(65) Prior Publication Data

US 2023/0162536 A1 May 25, 2023

(30) Foreign Application Priority Data

Nov. 25, 2021 (KR) .......................... 10-2021-0164815

(51) Int. Cl.
*G07C 5/00* (2006.01)
*B60L 58/12* (2019.01)
*B60L 58/16* (2019.01)
*B60W 50/14* (2020.01)

(52) U.S. Cl.
CPC .............. *G07C 5/004* (2013.01); *B60L 58/12* (2019.02); *B60L 58/16* (2019.02); *B60W 50/14* (2013.01); *B60L 2240/12* (2013.01); *B60W 2520/10* (2013.01); *B60W 2530/209* (2020.02)

(58) Field of Classification Search
None
See application file for complete search history.

(56) References Cited

U.S. PATENT DOCUMENTS

| | | | |
|---|---|---|---|
| 2012/0001594 A1* | 1/2012 | Berkowitz | H02J 7/0071 320/128 |
| 2013/0173106 A1* | 7/2013 | Konishi | B60W 20/11 701/123 |
| 2020/0226850 A1* | 7/2020 | Bower | B60Q 9/00 |
| 2021/0098998 A1* | 4/2021 | Eo | G01R 31/3835 |
| 2022/0176939 A1* | 6/2022 | Poll | B60W 10/26 |

* cited by examiner

*Primary Examiner* — Hongye Liang
(74) *Attorney, Agent, or Firm* — Fox Rothschild LLP

(57) ABSTRACT

An apparatus for controlling a vehicle includes a battery controller, a driving controller, and a notification device, wherein the battery controller may obtain state information of a battery, calculate remaining energy of the battery, and determine whether energy of the battery is excessively consumed, and the driving controller may obtain the remaining energy and route information, calculate a remaining driving distance, and determine a fuel efficiency deterioration section.

13 Claims, 10 Drawing Sheets

APPARATUS FOR CONTROLLING A VEHICLE AND A METHOD THEREOF

CROSS-REFERENCE TO RELATED APPLICATION

This application claims under 35 U.S.C. § 119(a) the benefit of Korean Patent Application No. 10-2021-0164815, filed on Nov. 25, 2021, the entire contents of which are incorporated herein by reference.

BACKGROUND

(a) Field

The present disclosure relates to an apparatus for controlling a vehicle and a control method thereof, and more particularly, to a technology for notifying an occupant of an electric vehicle regarding information on reducing a driving distance of an electric vehicle.

(b) Description of Related Art

When driving uphill or turning on the heating of an electric vehicle, the battery usage of the electric vehicle may increase rapidly. When the battery usage of an electric vehicle rapidly increases, the remaining driving distance of the electric vehicle displayed on a display device of the electric vehicle may suddenly decrease without additional information or notification. When the remaining driving distance of the electric vehicle displayed on the display device of the electric vehicle suddenly decreases without additional information or notification, occupants of electric vehicles may feel anxious or the quality and reliability of electric vehicles felt by the occupants of electric vehicles may decrease.

In an electric vehicle, the remaining driving distance may be calculated based on the remaining energy of the battery of an electric vehicle. The calculated remaining driving distance may be displayed on a display device of the electric vehicle.

SUMMARY

The present disclosure addresses the above-mentioned problems occurring in existing technologies while advantages achieved such existing technologies are maintained intact.

The technical problems to be solved by the present disclosure are not limited to the aforementioned problems, and any other technical problems not mentioned herein will be clearly understood from the following description by those skilled in the art to which the present disclosure pertains.

When a situation in which the remaining driving distance of an electric vehicle suddenly decreases occurs, example embodiments of the present disclosure may inform the occupants of the electric vehicle of the fact that the remaining driving distance is reduced and why the remaining driving distance decreases.

According to some embodiment(s) of the present disclosure, an apparatus for controlling a vehicle includes a battery controller, a driving controller, and a notification device. The battery controller obtains state information of a battery, calculates remaining energy of the battery, and determines whether energy of the battery is excessively consumed. The driving controller may be configured to obtain the remaining energy and route information, calculate a remaining driving distance, and determine a fuel efficiency deterioration section.

The notification device may be configured to notify whether the energy is excessively consumed during driving.

In some instances, the notification device may be configured to notify the fuel efficiency deterioration section according to a route setting.

The battery controller may be configured to monitor a state of charge (SoC) of the battery, a state of health (SoH) of the battery, and a state of power of the battery.

The battery controller may be configured to receive a current of the battery and a vehicle speed, and calculate a moving average value for a specified time.

In some instances, the battery controller may be configured to receive a current of the battery, an on/off switching state of heating and cooling of the vehicle, and an average consumption current when the heating and cooling is used, and calculate a moving average value for a specified time.

The remaining energy of the battery may be energy measured when the battery is discharged with a constant current (I) from an initial state of charge of the battery to a final state of charge, and the constant current may be calculated as a moving average of past currents in a current driving cycle when the constant current changes unpredictably.

In some instances, the battery controller may be configured to calculate the remaining energy based on the moving average value for the specified time and the remaining energy based on the moving average value before the specified time when the current of the battery and the vehicle speed are input and the moving average value for the specified time is calculated.

In some instances, the battery controller may be configured to separately calculate the remaining energy of the battery for the specified time according to the on/off switching state of the heating and cooling when the current of the battery, the on/off switching state of the heating and cooling of the vehicle, and the average consumption current when the heating and cooling are used, are received and the moving average value for the specified time is calculated.

A comparison result of a moving average current of the battery and current speed information may be used when information on a reduction in driving distance due to rapid acceleration is notified.

In exemplary embodiments, the driving controller may be configured to calculate the remaining driving distance based on the on/off switching state of the heating and cooling when the battery controller receives the current of the battery, the on/off switching state of the heating and cooling of the vehicle and the average consumption current when the heating and cooling are used, and calculates the moving average value for the specified time, and calculate the remaining energy of the battery.

The driving controller may be configured to calculate a first remaining driving distance that does not consider the route information and a second remaining driving distance that considers the route information.

According to some embodiment(s) of the present disclosure, a method of controlling an apparatus for controlling a vehicle includes obtaining, by a battery controller, state information of a battery, calculating, by the battery controller, remaining energy of the battery, determining, by the battery controller, whether energy of the battery is excessively consumed, notifying, by a notification device, whether the energy is excessively consumed during driving, obtaining, by a driving controller, the remaining energy and route information, calculating, by the driving controller, a remaining driving distance, determining, by the driving controller, a fuel efficiency deterioration section, and notifying, by a notification device, the fuel efficiency deterioration section according to a route setting.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
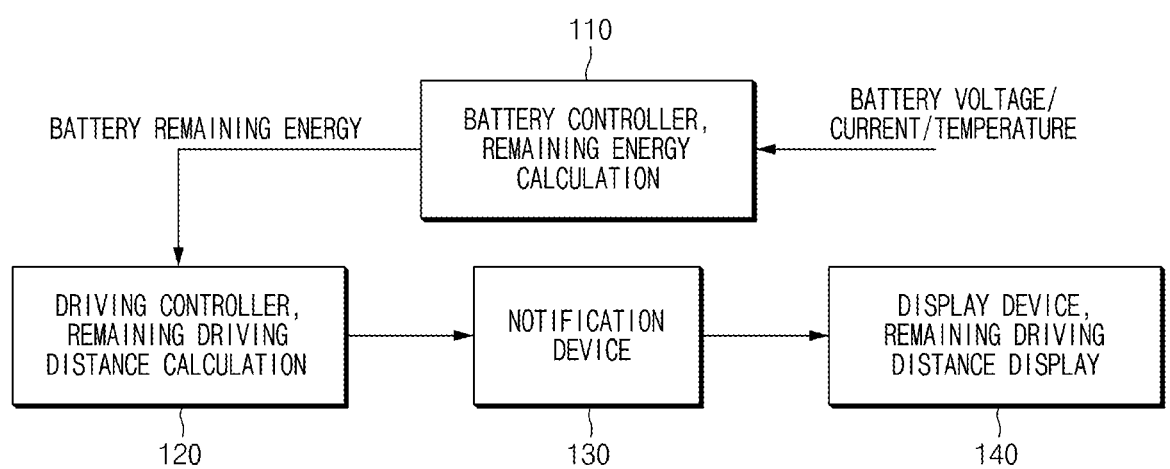
FIG. 1 is a block diagram illustrating that an apparatus for controlling a vehicle calculates and displays a remaining driving distance of an electric vehicle.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defiled herein.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiments are described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, with reference to FIGS. 1 to 10, embodiments of the present disclosure will be described in detail.

FIG. 1 is a block diagram illustrating that an apparatus for controlling a vehicle calculates and displays a remaining driving distance of an electric vehicle.

An apparatus for controlling a vehicle may include a battery controller 110, a driving controller 120, a notification device 130, and a display device 140.

The battery controller 110 may be configured to obtain a voltage of a battery of an electric vehicle, a current of the battery, and temperature of the battery. The battery controller 110 may be configured to calculate the remaining energy of the battery. The battery controller 110 may be configured to transmit the remaining energy of the battery to the driving controller 120. The battery controller 110 may be referred to as a battery management system (BMS).

The driving controller 120 may be configured to acquire the remaining energy of the battery. The driving controller 120 may be configured to calculate a remaining driving distance. The driving controller 120 may be configured to transmit the remaining driving distance to the notification device 130. The driving controller 120 may also be referred to herein as a vehicle controller (VCU).

The notification device 130 may be configured to acquire the remaining driving distance. The notification device 130 may be configured to notify an occupant of the electric vehicle of the remaining driving distance. The notification device 130 may be configured to transmit the remaining driving distance to the display device 140. The notification device 130 may be referred to as audio video navigation (AVN).

The display device 140 may be configured to acquire the remaining driving distance. The display device 140 may be configured to visually display the remaining driving distance. The display device 140 may be referred to as a cluster.

An apparatus for controlling a vehicle may be configured to calculate the remaining driving distance of the electric vehicle through a remaining driving distance calculation equation in the driving controller 120 by using the value calculated by the battery controller 110 for the remaining energy of the battery. The remaining driving distance calculation equation may be expressed as following Equation 1.

Remaining driving distance=Remaining energy of battery*Fuel efficiency of electric vehicle [Equation 1]

The apparatus for controlling a vehicle may be configured to calculate the remaining driving distance in consideration of the battery condition of the electric vehicle in real time within the system. In a situation where the battery usage of an electric vehicle rapidly increases, such as when driving uphill or when the electric vehicle's heating is turned on, the remaining driving distance of the electric vehicle may suddenly decrease. When a sudden decrease in the remaining driving distance of an electric vehicle is displayed without additional information or notification, the occupants of the electric vehicle may feel anxious or the quality and reliability of the electric vehicle felt by the occupants of the electric vehicle may decrease. According to the present disclosure, it is possible to provide a notification to the occupant of the electric vehicle about a situation in which the remaining driving distance of the electric vehicle rapidly decreases.

Figure 2:
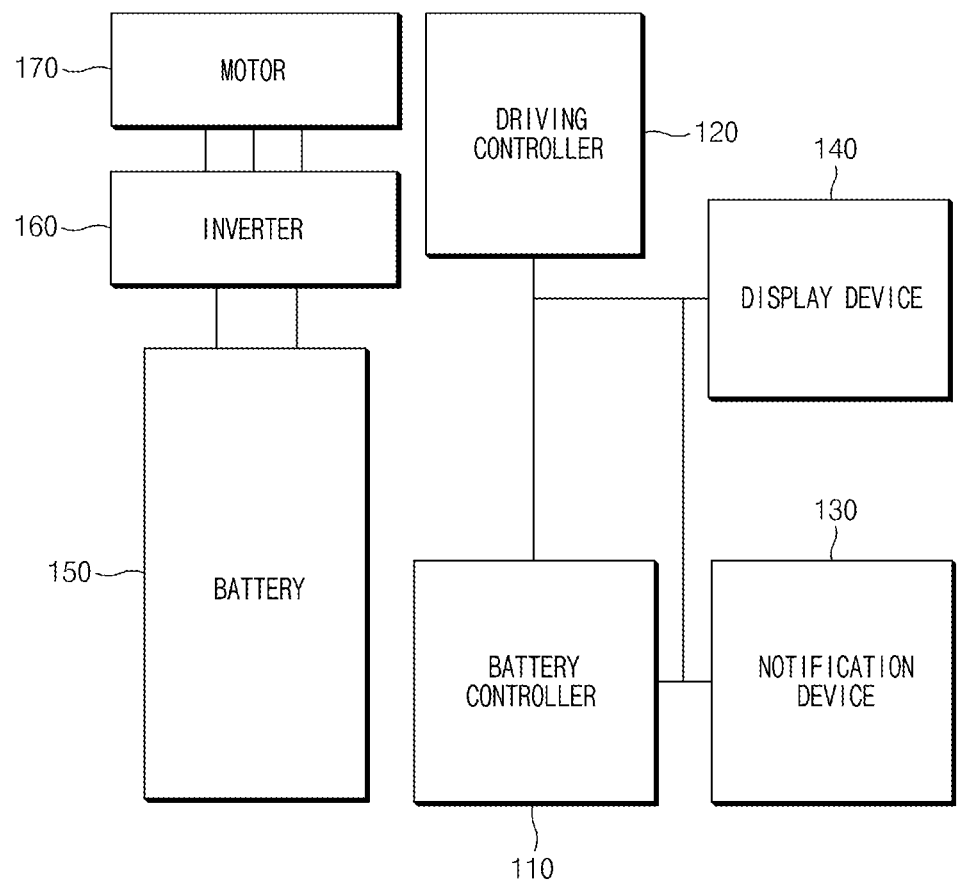
FIG. 2 is a block diagram illustrating an apparatus for controlling a vehicle according to an embodiment of the present disclosure.

FIG. 2 is a block diagram illustrating an apparatus for controlling a vehicle according to an embodiment of the present disclosure.

An apparatus for controlling a vehicle may include the battery controller 110, the driving controller 120, the notification device 130, the display device 140, a battery 150, an inverter 160, and a motor 170.

The battery controller 110 may be configured to monitor the state of the battery 150. The battery controller 110 may be configured to monitor a state of charge (SoC) of the battery 150, a state of health (SoH) of the battery 150, and a power state of the battery 150.

The driving controller 120 may be configured to control the motor 170 and the inverter 160. The driving controller 120 may be configured to monitor the states of the motor 170 and the inverter 160.

The notification device 130 may be configured to provide a vehicle convenience function of the electric vehicle. The notification device 130 may be configured to provide navigation, air conditioning, audio, and other additional vehicle-related functions of the electric vehicle. The notification device 130 may be configured to remotely transmit vehicle information about the electric vehicle. The notification device 130 may be configured to transmit navigation, air conditioning, audio, and other additional vehicle-related information of the electric vehicle to a portable communication device or an external server.

The display device 140 may be configured to transmit vehicle information of the electric vehicle to the occupant of the electric vehicle. The display device 140 may be configured to display the speed of the electric vehicle, the electric power consumption of the electric vehicle, the remaining capacity of the battery 150, and other vehicle information of the electric vehicle.

The battery 150 may be configured to drive the motor 170 by transferring electrical energy to the inverter 160. The battery 150 may be a high voltage battery used in an electric vehicle.

The inverter 160 may be configured to convert the direct current (DC) output of the battery 150 into a three-phase current and transmit the three-phase current to the motor 170 to drive the motor 170. The inverter 160 may convert the three-phase power of the motor 170 into direct current power to perform a regenerative operation of transferring it to the battery 150.

The motor 170 may be configured to convert electrical energy into rotational energy. The motor 170 may be configured to transmit rotational energy to a drive shaft that rotates the wheels of the electric vehicle.

Figure 3:
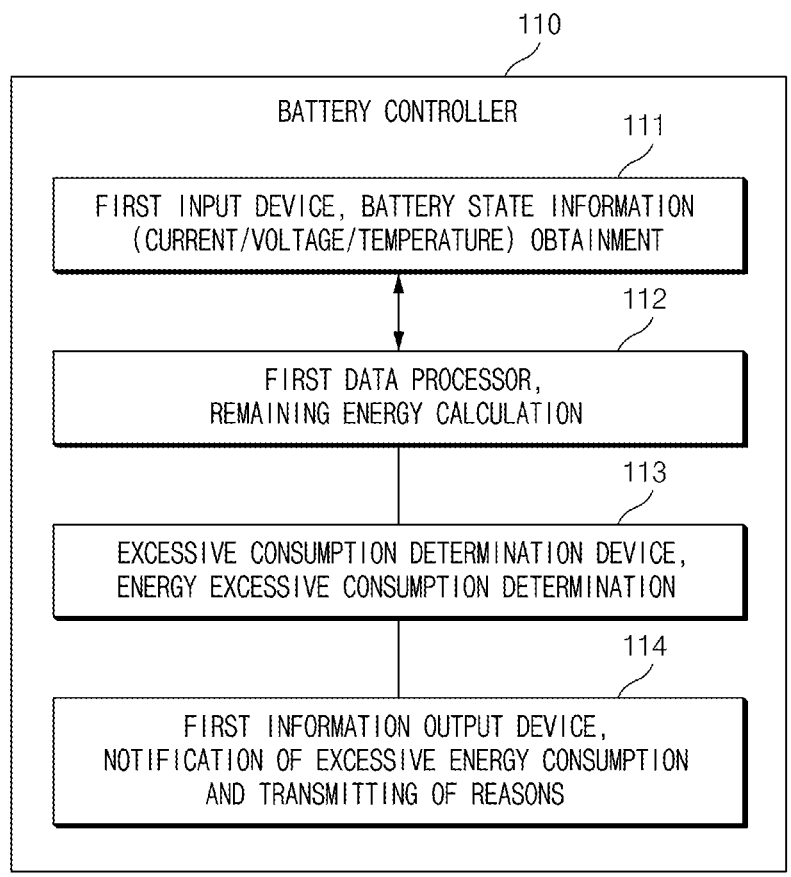
FIG. 3 is a block diagram illustrating a battery controller according to an embodiment of the present disclosure.

FIG. 3 is a block diagram illustrating a battery controller according to an embodiment of the present disclosure.

The battery controller 110 may include a first input device 111, a first data processor 112, an excessive consumption determination device 113, and a first information output device 114.

The first input device 111 may be configured to obtain battery state information. The first input device 111 may be configured to obtain the current, voltage and temperature of the battery. The battery state information obtained by the first input device 111 may be used to calculate the remaining energy of the battery.

The first data processor 112 may be configured to calculate the remaining energy. The first data processor 112 may be configured to calculate the remaining energy of the battery by using the battery state information received from the first input device 111.

The excessive consumption determination device 113 may be configured to determine whether energy is excessively consumed. The excessive consumption determination device 113 may be configured to check a current remaining energy value. The excessive consumption determination device 113 may be configured to check a previous remaining energy value. The excessive consumption determination device 113 may be configured to compare the difference in the remaining energy. The excessive consumption determination device 113 may be configured to compare the currently calculated remaining energy value and the previously calculated remaining energy value through the average current consumption value of the battery. The excessive consumption determination device 113 may be configured to calculate a difference value between the current remaining energy value and the previous remaining energy value through comparison. The excessive consumption determination device 113 may be configured to determine whether energy is excessively consumed based on the difference value.

The first information output device 114 may be configured to notify whether energy is excessively consumed. The first information output device 114 may be configured to transmit a reason for excessive energy consumption. The first information output device 114 may be configured to notify whether the energy is excessively consumed based on the determination of whether the energy is excessively consumed. When the energy is excessively consumed, the first information output device 114 may be configured to transmit the reason for the excessive energy consumption. The first information output device 114 may be configured to transmit whether the energy is excessively consumed and the reason for the excessive energy consumption to the notification device and/or the display device.

Figure 4:
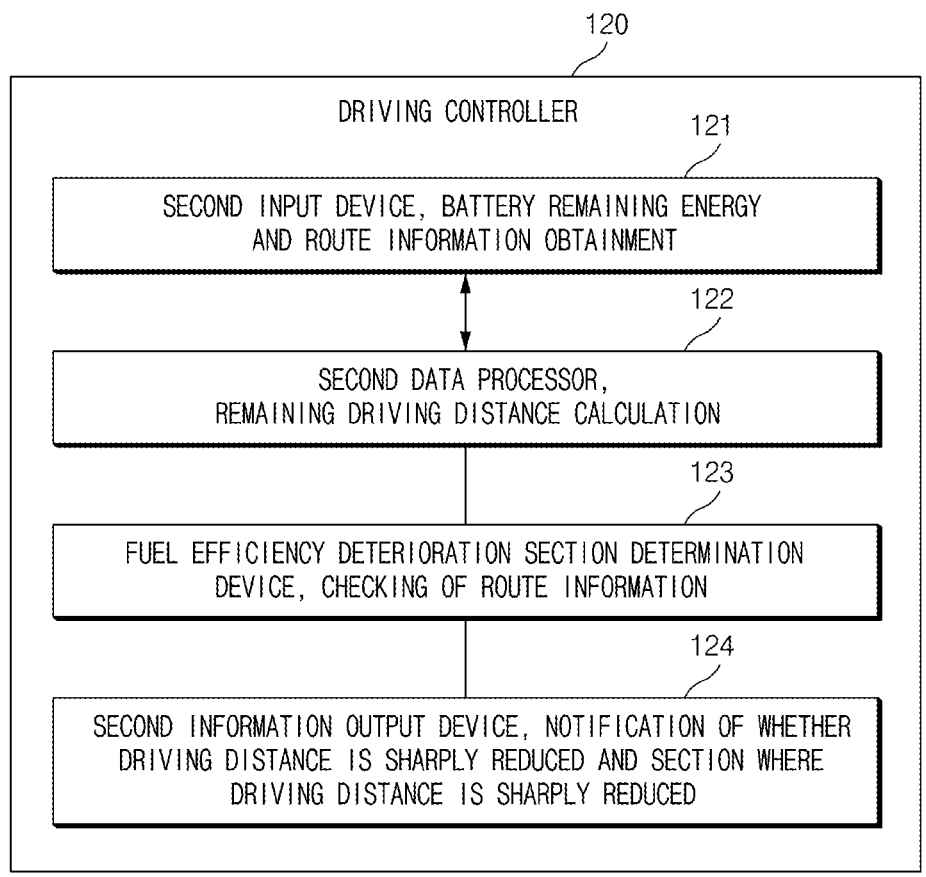
FIG. 4 is a block diagram illustrating a driving controller according to an embodiment of the present disclosure.

FIG. 4 is a block diagram illustrating a driving controller according to an embodiment of the present disclosure.

The driving controller 120 may include a second input device 121, a second data processor 122, a fuel efficiency deterioration section determination device 123, and a second information output device 124.

The second input device 121 may be configured to obtain battery remaining energy. The second input device 121 may be configured to obtain battery remaining energy information from the battery controller 110. The second input device 121 may be configured to obtain route information. The second input device 121 may be configured to obtain travel route information from the notification device 130. The remaining battery energy and route information obtained by the second input device 121 may be used to calculate the remaining driving distance of the electric vehicle.

The second data processor 122 may be configured to calculate the remaining driving distance. The second data processor 122 may be configured to calculate the remaining driving distance of the electric vehicle by using the remaining battery energy and route information received from the second input device 121.

The fuel efficiency deterioration section determination device 123 may be configured to check the fuel efficiency deterioration section. The fuel efficiency deterioration section determination device 123 may be configured to check the route information. The fuel efficiency deterioration section determination device 123 may be configured to check a ratio of an uphill section in the entire section of the route in order to check the route information. The fuel efficiency deterioration section determination device 123 may be configured to determine whether a section corresponds to the fuel efficiency deterioration section according to the route type by checking the route information.

The second information output device 124 may be configured to notify whether the driving distance sharply decreases. The second information output device 124 may be configured to notify whether the driving distance is rapidly reduced based on the determination result of whether the section corresponds to the fuel efficiency deterioration section. The second information output device 124 may be configured to notify a section in which the driving distance sharply decreases. The second information output device 124 may be configured to transmit a notification informing that the section to be driven in the future is a section in which the driving distance is sharply reduced based on the determination result of whether the section corresponds to the fuel efficiency deterioration section. The second information output device 124 may be configured to transmit a notification informing whether the driving distance is decreased sharply and a section in which the driving distance is decreased sharply to the notification device and/or the display device.

Hereinafter, it is assumed that an apparatus for controlling a vehicle performs the process of FIG. 5. In addition, in the description of FIG. 5, an operation described as being performed by the device may be understood as being controlled by a processor (e.g., a processor 1100 of FIG. 10) of the apparatus for controlling a vehicle.

Figure 5:
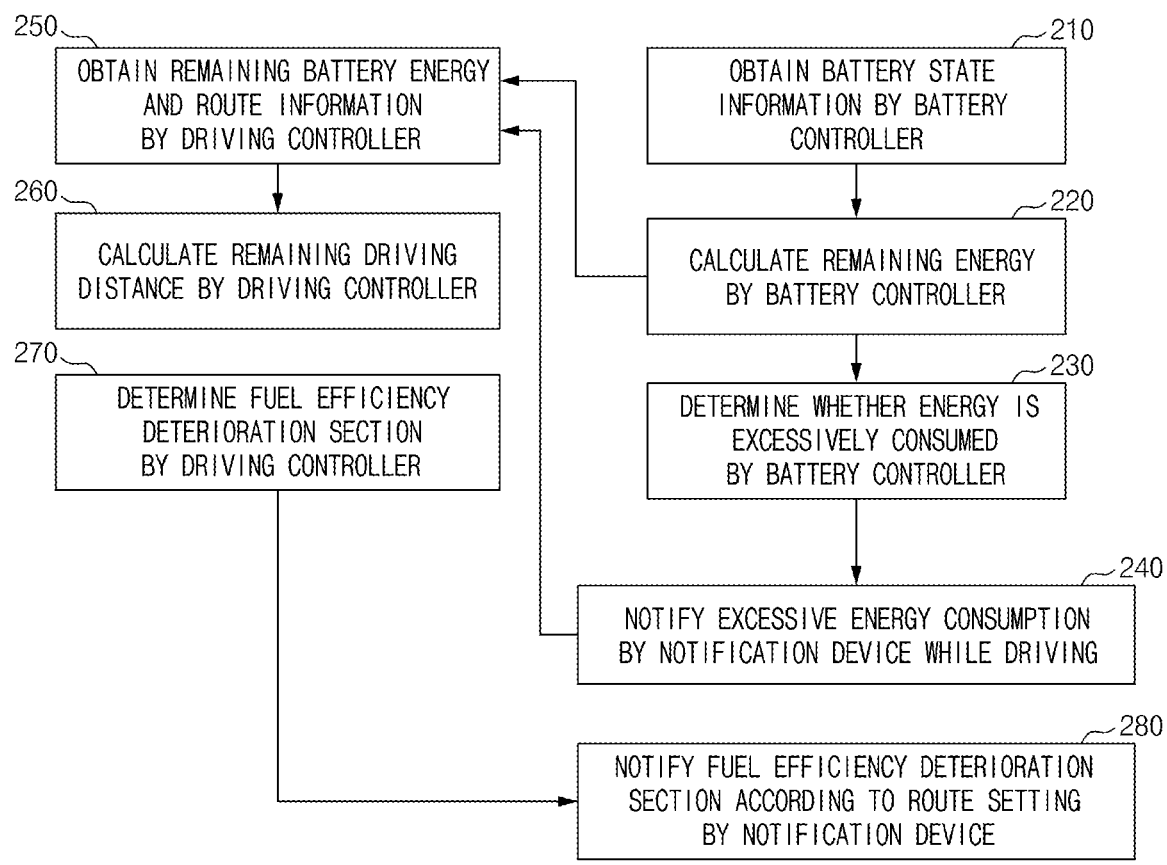
FIG. 5 is a flowchart illustrating a method of notifying, by an apparatus for controlling a vehicle, information on a driving distance reduction of an electric vehicle according to an embodiment of the present disclosure.

FIG. 5 is a flowchart illustrating a method of notifying, by an apparatus for controlling a vehicle, information on a driving distance reduction of an electric vehicle according to an embodiment of the present disclosure.

In operation 210, an apparatus for controlling a vehicle may be configured to acquire battery state information from the battery controller. The battery controller may be configured to receive data related to the temperature, current and voltage of the battery of the electronic vehicle.

The battery controller may be configured to receive the current of the battery and the vehicle speed and calculate a moving average value for a specified time. For example, the battery controller may be configured to calculate a moving average value for 10 seconds. The battery controller may be configured to calculate a current moving average value and a speed moving average value for 10 seconds.

The battery controller may be configured to receive the current of the battery, the heating/cooling on/off switching state of the vehicle, and the average consumption current when heating/cooling is used, and may calculate a moving average value for a specified time. For example, the battery controller may be configured to calculate a moving average value for 10 seconds. The battery controller may be configured to calculate a current moving average value for 10 seconds.

In operation 220, the apparatus for controlling a vehicle may be configured to calculate the remaining energy through the battery controller. The battery controller may be configured to calculate the remaining energy of the battery by using data related to the temperature, current and voltage of the battery.

The remaining energy of the battery may be defined as energy measured when the battery is discharged with a constant current (I) from the initial state of charge to the final state of charge of the battery. The remaining energy of the battery may be calculated using Equation 2 below.

$$\text{Remaining Energy} = \int_{t_{soc\_initial}}^{t_{soc\_final}} V_t(t) \times I \, dt \quad \text{[Equation 2]}$$

The constant current (I) may change unpredictably depending on the load of the electric vehicle in the case of a future discharge current. When the constant current (I) changes unpredictably, the constant current (I) may be calculated as a moving average of the past currents in the current driving cycle. The constant current (I) may be determined by comparing the moving average of the current calculated in the past with the moving average of the current currently calculated.

When the current and vehicle speed of the battery are received and the moving average value for a specified time is calculated, the battery controller may be configured to calculate the remaining energy based on the moving average value for the specified time and the remaining energy based on the moving average value before the specified time. For example, the battery controller may be configured to calculate the remaining energy based on a moving average value for 10 seconds and the remaining energy based on a moving average value before 10 seconds.

When the current of the battery, the heating/cooling on/off switching state of the vehicle, and the average consumption current when heating and cooling are used are input and the moving average value for a specified time is calculated, the battery controller may be configured to separately calculate the remaining battery energy for the specified time depending on the heating/cooling on/off switching state. For example, when the heating/cooling on/off switching state is in the off state, the battery controller may be configured to calculate the first remaining energy value based on a moving average value for 10 seconds. When the heating/cooling on/off switching state is in the on state, the battery controller may be configured to calculate a value obtained by adding an average consumption current by heating/cooling to a moving average value before 10 seconds as a second remaining energy value.

In operation 230, the battery controller of the apparatus for controlling a vehicle may be configured to determine whether energy is excessively consumed. The battery controller may be configured to determine whether the energy of the battery is being excessively consumed by comparing the current remaining energy of the battery with the previous remaining energy of the battery. The battery controller may be configured to determine the type of reduction in the driving distance according to the type of energy consumption of the battery.

The apparatus for controlling a vehicle may be configured to use the moving average current comparison result of the battery and the current speed information when notifying the driving distance reduction information due to rapid acceleration. The battery controller may be configured to compare the remaining energy for the specified time with the remaining energy before the specified time. For example the battery controller may be configured to compare the current remaining energy and the remaining energy 10 seconds ago. The battery controller may be configured to check whether the remaining energy 10 seconds ago is greater than 1.1 times the current remaining energy. When the remaining energy 10 seconds ago is greater than 1.1 times the current remaining energy, the battery controller may be configured to determine that the energy of the battery is rapidly consumed for 10 seconds. The battery controller may be configured to compare the average speed value for the specified time and the average speed value before the specified time. For example, the battery controller may be configured to compare the current speed average value and the speed average value 10 seconds before. The battery controller may be configured to check whether 1.1 times the average speed value 10 seconds ago is smaller than the current speed average value. When 1.1 times the speed average value 10 seconds ago is less than the current speed average value, the battery controller may be configured to determine that the energy of the battery is rapidly consumed while the speed average value abruptly increases for 10 seconds.

In operation 240, the notification device of the apparatus for controlling a vehicle may be configured to notify excessive energy consumption while driving. The notification device may be configured to display whether the energy of the battery is excessively consumed as a visual warning or notification. When the energy of the battery is excessively consumed, the notification device may be configured to provide a notification that the energy of the battery is excessively consumed while driving to the occupant of the electric vehicle. The notification device may be configured to provide a notification for each type according to the type of reduction in the driving distance to the occupant of the electric vehicle.

In operation 250, the apparatus for controlling a vehicle may be configured to obtain remaining battery energy and route information through the driving controller. The driving controller may be configured to obtain the battery remaining energy from the battery controller. The driving controller may be configured to obtain the route information from the notification device.

The driving controller may be configured to analyze the route by using the obtained route information. The driving controller may be configured to analyze the route for each slope type. The driving controller may be configured to calculate a ratio of an uphill route and a ratio of other routes among all routes.

In operation 260, the apparatus for controlling a vehicle may be configured to calculate the remaining driving distance through the driving controller. The driving controller may be configured to calculate the remaining driving distance of the electric vehicle based on the remaining battery energy and route information.

When the battery controller receives the battery current, the heating/cooling on/off switching state, and the average consumption current when heating and cooling are used, and calculates the moving average value for a specified time, and calculate the remaining battery energy, the driving controller may be configured to calculate the remaining driving distance based on the heating/cooling on/off switching state. For example, the driving controller may be configured to calculate the remaining driving distance by using the first remaining energy value when the heating/cooling on/off switching state is off, and using the second remaining energy value when the heating/cooling on/off switching state is on.

The driving controller may be configured to calculate the first remaining driving distance without considering the route information. The driving controller may be configured to calculate the second remaining driving distance in consideration of the route information.

In operation 270, the apparatus for controlling a vehicle may be configured to determine a fuel efficiency deterioration section through the driving controller. The driving controller may be configured to determine whether fuel efficiency deteriorates based on the remaining driving distance and a section on the route in which fuel efficiency deteriorates.

In operation 280, the apparatus for controlling a vehicle may be configured to notify the fuel efficiency deterioration section according to the route setting through the notification device. The notification device may be configured to determine whether there is a section in which fuel efficiency deteriorates in the set route and may notify which portion and by what ratio there is a fuel economy deterioration section on the route.

The notification device may be configured to receive the first remaining driving distance and the second remaining driving distance from the driving controller. The notification device may be configured to compare and notify the first remaining driving distance and the second remaining driving distance.

According to the present disclosure, the occupant of the electric vehicle may be made aware of a situation in which the driving distance of the electric vehicle is reduced and information related thereto. Example embodiments of the present disclosure is directed to a method to determine whether the energy being used from the battery abruptly increases and the type of route in a situation in which the driving distance of the battery may decrease sharply, and notify the occupant of it in real time. According to the present disclosure, notifying the occupants of the electric vehicle regarding whether the driving distance is abruptly reduced and the reason for the decrease in the driving distance may relieve the anxiety of the occupants, and maintain the reliability of the quality of the electric vehicle felt by the occupants of the electric vehicle.

Figure 6:
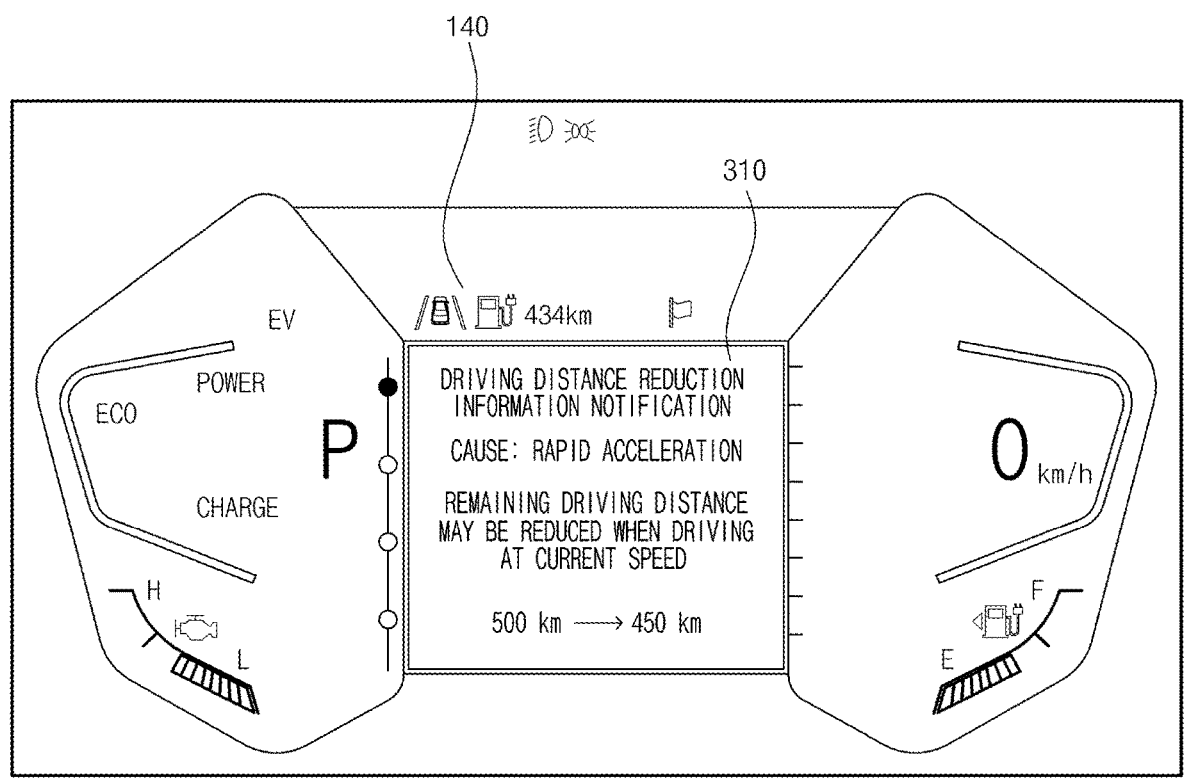
FIG. 6 is a view illustrating that an apparatus for controlling a vehicle notifies the driving distance reduction information according to an embodiment of the present disclosure.

FIG. 6 is a view illustrating that an apparatus for controlling a vehicle notifies the driving distance reduction information according to an embodiment of the present disclosure.

A display device 410 of an electric vehicle may be configured to display a first notification 310. The first notification 310 may be configured to notify information that the driving distance is reduced. The first notification 310 may be configured to display that the cause of the decrease in the driving distance is sudden acceleration. The first notification 310 may be configured to display a guide that the remaining driving distance may be reduced when driving at a current speed. The first notification 310 may be configured to compare and display the remaining driving distance before the decrease and the reduced remaining driving distance. For example, the first notification 310 may be configured to display a guide that the remaining driving distance may decrease from 500 km to 450 km.

As described in connection with FIG. 5, when the driving distance reduction information due to rapid acceleration is notified, the battery moving average current comparison result and current speed information may be used. The apparatus for controlling a vehicle may be configured to determine whether energy is excessively consumed by using the comparison result of the battery moving average current and the current speed information. The apparatus for controlling a vehicle may be configured to calculate the remaining driving distance based on the remaining battery energy and route information. The apparatus for controlling a vehicle may be configured to notify the driving distance reduction information through the first notification 310.

Figure 7:
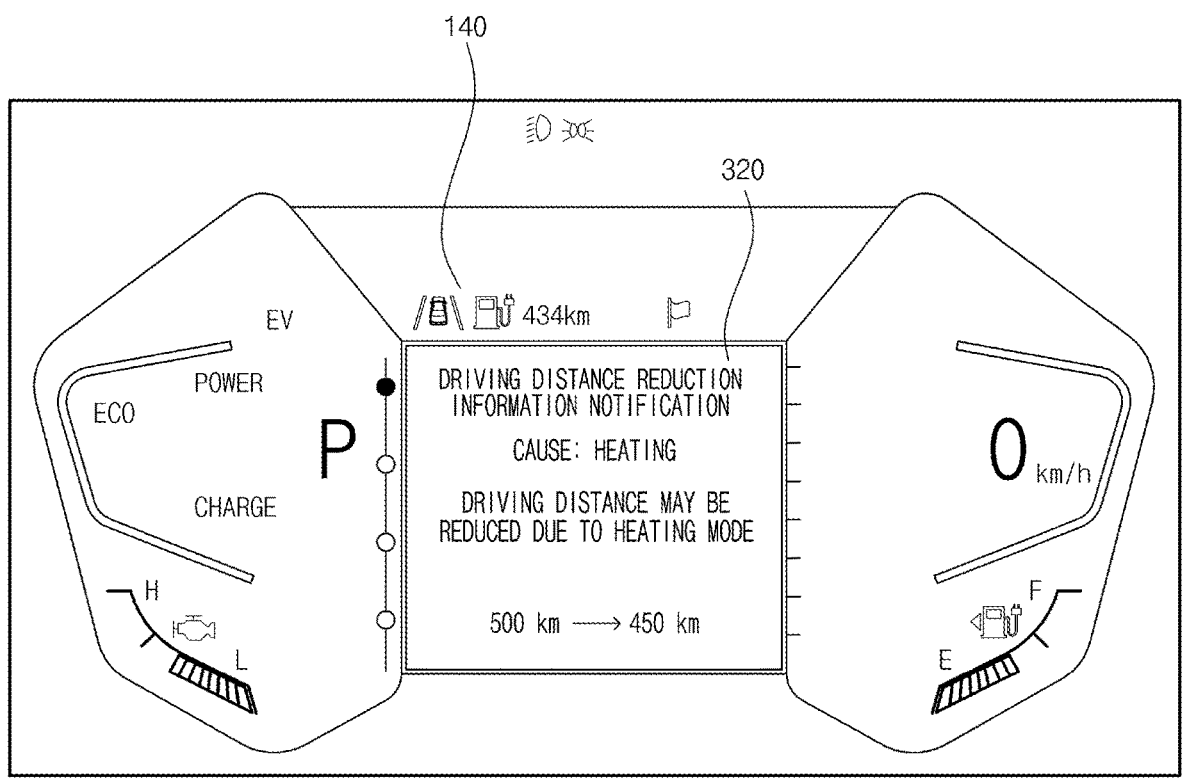
FIG. 7 is a view showing that the apparatus for controlling a vehicle notifies the driving distance reduction information according to an embodiment of the present disclosure.

FIG. 7 is a view showing that the apparatus for controlling a vehicle notifies the driving distance reduction information according to an embodiment of the present disclosure.

The display device 410 of the electric vehicle may be configured to display a second notification 320. The second notification 320 may be configured to notify information that the driving distance is reduced. The second notification 320 may be configured to display that the cause of the decrease in the driving distance is heating. The second notification 320 may be configured to display a guide that the remaining driving distance may be reduced due to the heating mode. The second notification 320 may be configured to compare and display the remaining driving distance before the decrease and the reduced remaining driving distance. For example, the second notification 320 may be configured to display a guide that the remaining driving distance may decrease from 500 km to 450 km.

As described in connection with FIG. 5, when notifying information on driving distance reduction due to heating and cooling, the battery moving average current and information on the heating/cooling on/off switching state may be used. The apparatus for controlling a vehicle may be configured to determine whether energy is excessively consumed by using the comparison result of comparing the battery moving average current and the heating/cooling on/off switching state. The apparatus for controlling a vehicle may be configured to calculate the remaining driving distance based on the remaining battery energy and route information. The apparatus for controlling a vehicle may be configured to notify the driving distance reduction information through the second notification 320.

Figure 8:
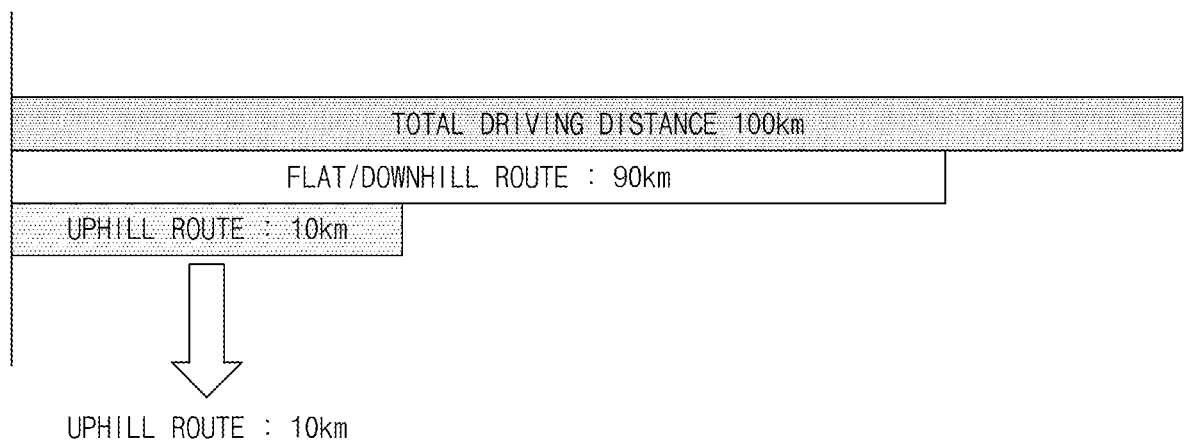
FIG. 8 is a diagram illustrating that an apparatus for controlling a vehicle analyzes a route according to an embodiment of the present disclosure.

FIG. 8 is a diagram illustrating that an apparatus for controlling a vehicle analyzes a route according to an embodiment of the present disclosure.

Figure 9:
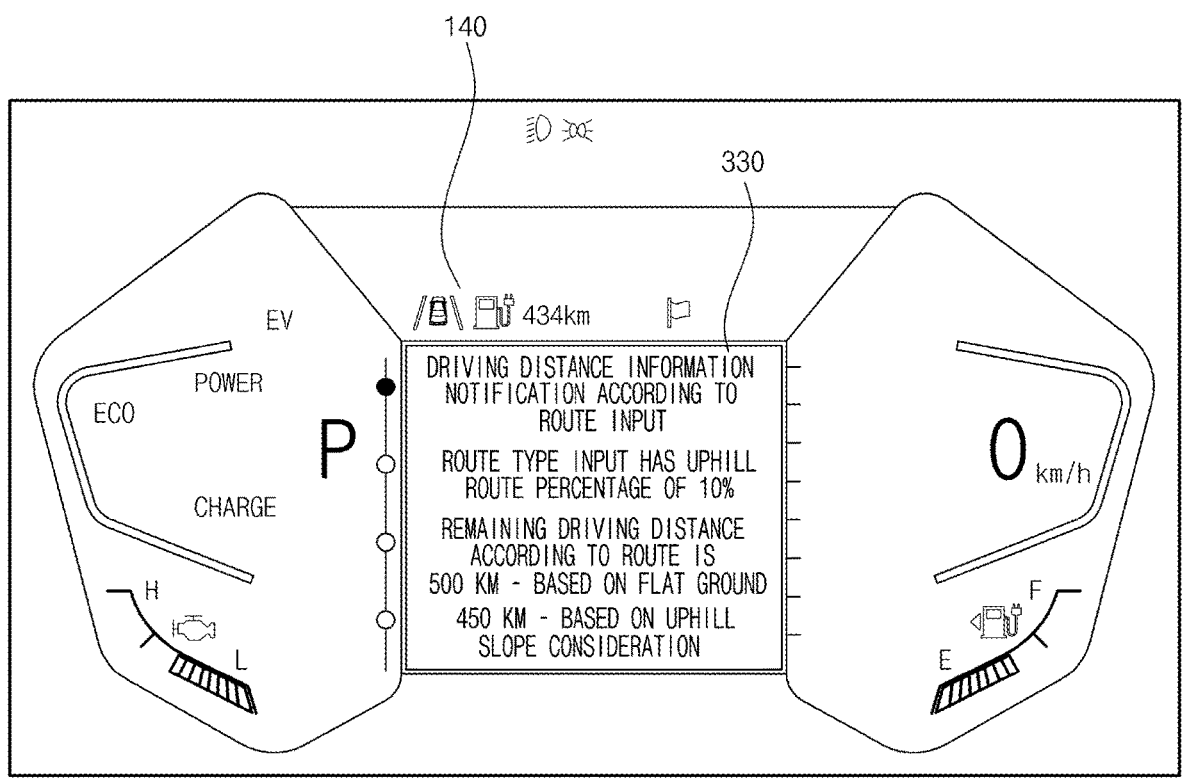
FIG. 9 is a diagram illustrating that an apparatus for controlling a vehicle according to an embodiment of the present disclosure notifies driving distance information according to a route input.

The apparatus for controlling a vehicle may be configured to distinguish the total driving distance in the route, the flat/downhill route, and the uphill route. For example, an apparatus for controlling a vehicle may be configured to distinguish that the total driving distance is 100 km, the flat/downhill route is 90 km, and the uphill route is 10 km. The apparatus for controlling a vehicle may be configured to classify the uphill route in detail according to the inclination. For example, the apparatus for controlling a vehicle may be configured to classify a section having a slope of 10 degrees or less as 10% of the uphill section and a section having a slope of 20 degrees or less as 40% of the uphill section FIG. 9 is a diagram illustrating that an apparatus for controlling a vehicle according to an embodiment of the present disclosure notifies driving distance information according to a route input.

The display device 410 of the electric vehicle may be configured to display a third notification 330. The third notification 330 may be configured to notify the driving distance information according to the route input. The third notification 330 may be configured to display the ratio of the uphill section in the type of the input route. For example, the third notification 330 may be configured to display a guide that the uphill section is 10% in the type of the input route. The third notification 330 may be configured to display the first remaining driving distance that does not consider the route information and the second remaining driving distance that considers the route information as the residual driving distance according to the route. For example, the third notification 330 may be configured to display a guide that the remaining driving distance according to the route is 500 km based on a flat ground and 450 km based on an uphill slope.

As described in connection with FIG. 5, when the driving distance reduction information is notified by the route information, the remaining battery energy and the route information received from the notification device such as navigation may be used. The apparatus for controlling a vehicle may be configured to analyze the route by using the remaining battery energy and route information. The apparatus for controlling a vehicle may be configured to calculate the first remaining driving distance that does not reflect the result of analyzing the route and the second remaining driving distance that reflects the result of analyzing the route. The apparatus for controlling a vehicle may be configured to compare and notify the first remaining driving distance and the second remaining driving distance.

Figure 10:
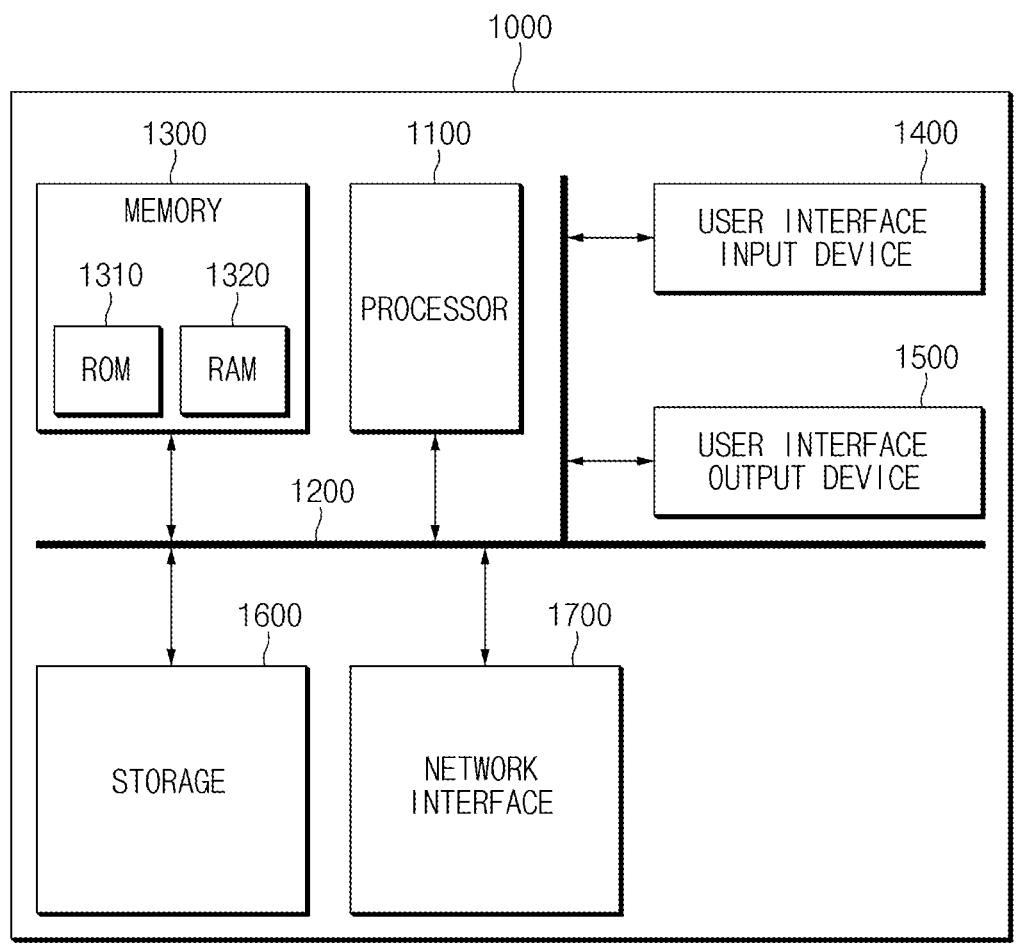
FIG. 10 is a block diagram illustrating a computing system according to an embodiment of the present disclosure.

FIG. 10 is a block diagram illustrating a computing system according to an embodiment of the present disclosure.

Referring to FIG. 10, a computing system 1000 may include at least one processor 1100, a memory 1300, a user interface input device 1400, a user interface output device 1500, storage 1600, and a network interface 1700 connected through a bus 1200.

The processor 1100 may be a central processing device (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Accordingly, the processes of the method or algorithm described in relation to the embodiments of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, solid state drive (SSD), a detachable disk, or a CD-ROM.

The exemplary storage medium is coupled to the processor 1100, and the processor 1100 may be configured to read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

The present technology may be configured to notify the occupants of the electric vehicle of the fact that the remaining driving distance is reduced and the reason why the remaining driving distance decreases when a situation in which the remaining driving distance of the electric vehicle suddenly decreases occurs, so that it is possible to relieve the anxiety of electric vehicle occupants and maintain the reliability of electric vehicle quality felt by electric vehicle occupants.

In addition, various effects that are directly or indirectly understood through the present disclosure may be provided.

Although exemplary embodiments of the present disclosure have been described for illustrative purposes, those skilled in the art will appreciate that various modifications, additions and substitutions are possible, without departing from the scope and spirit of the disclosure.

Therefore, the exemplary embodiments disclosed in the present disclosure are provided for the sake of descriptions, not limiting the technical concepts of the present disclosure, and it should be understood that such exemplary embodiments are not intended to limit the scope of the technical concepts of the present disclosure. The protection scope of the present disclosure should be understood by the claims below, and all the technical concepts within the equivalent scopes should be interpreted to be within the scope of the right of the present disclosure.

What is claimed is:

1. An apparatus for controlling a vehicle, the apparatus comprising:
   a battery controller including a first processor; and
   a driving controller including a second processor;
   wherein the battery controller is configured to:
      obtain state information of a battery;
      calculate remaining energy of the battery based on the obtained state information of the battery; and
   wherein the driving controller is configured to:
      obtain the remaining energy and route information;
      calculate a remaining driving distance based on the obtained remaining energy of the battery and the route information, wherein the remaining energy of the battery is calculated according to a heating and cooling on/off switching state; and
      output information on a sudden driving distance reduction based on the remaining driving distance to notify an occupant of the vehicle of a reason why the driving distance is suddenly reduced;
   wherein the information on the sudden driving distance reduction includes the reason why the driving distance is suddenly reduced;
   wherein the reason why the driving distance is suddenly reduced includes rapid acceleration, heating and cooling of the vehicle, or route information;
   wherein the battery controller is further configured to determine a type of driving distance reduction according to a type of energy consumption of the battery, and
   wherein the driving controller is further configured to analyze a route for each slope type by using the obtained route information and determine a type of route in a situation in which the driving distance decreases.

2. The apparatus of claim 1, wherein the battery controller is configured to monitor a state of charge (SoC) of the battery, a state of health (SoH) of the battery, and a state of power of the battery.

3. The apparatus of claim 1, wherein the battery controller is configured to:
   calculate a first average of battery current obtained from a first time point to a second time point and a second average of speed of vehicle obtained from the first time point to the second time point; and
   calculate a third average of battery current obtained before the first time point and a fourth average of speed of vehicle obtained from the first time point;
   wherein the first average, the second average, the third average, and the fourth average are calculated for outputting information on the sudden driving distance reduction due to rapid acceleration.

4. The apparatus of claim 3, wherein the battery controller is configured to:
   calculate a first remaining energy of the battery based on the first average and the second average; and
   calculate a second remaining energy of the battery based on the third average and the fourth average.

5. The apparatus of claim 1, wherein the driving controller is configured to calculate the remaining driving distance based on the first remining energy and the second remaining energy.

6. The apparatus of claim 1, wherein the battery controller is configured to:
   calculate a first average of battery current obtained from a first time point to a second time point and a third average of speed of vehicle obtained from the first time point to the second time point,
   wherein the first average and the third average are calculated for outputting information on the sudden driving distance reduction due to heating and cooling of the vehicle.

7. The apparatus of claim 6, wherein the battery controller is configured to:
  calculate a third remaining energy of the battery based on the first average when the heating and cooling on/off switching state is off; and
  calculate a fourth remaining energy of the battery based on the third average when the heating and cooling on/off switching state is on.

8. The apparatus of claim 7, wherein the driving controller is configured to calculate the remaining driving distance based on the third remaining energy and the fourth remaining energy.

9. The apparatus of claim 1, wherein the driving controller is configured to calculate a ratio of an uphill section based on the route.

10. The apparatus of claim 9, wherein the driving controller is configured to calculate a first remaining driving distance that does not consider the route information and a second remaining driving distance that considers the route information.

11. The apparatus of claim 10, wherein the information on the sudden driving distance reduction is output based on a comparison result of the first remaining driving distance and the second remaining driving distance.

12. A method of controlling an apparatus for controlling a vehicle, the method comprising:
  obtaining, by a battery controller of the apparatus for controlling the vehicle, state information of a battery;
  calculating, by the battery controller, remaining energy of the battery based on the obtained state information of the battery;
  obtaining, by a driving controller of the apparatus for controlling the vehicle, the remaining energy and route information;
  calculating, by the driving controller, a remaining driving distance based on the obtained remaining energy of the battery and the route information, wherein the remaining energy of the battery is calculated according to a heating and cooling on/off switching state; and
  outputting, by the driving controller, information on a sudden driving distance reduction based on the remaining driving distance to notify an occupant of the vehicle of a reason why the driving distance is suddenly reduced;
  wherein the information on the sudden driving distance reduction includes the reason why the driving distance is suddenly reduced; and
  wherein the reason why the driving distance is suddenly reduced includes rapid acceleration, heating and cooling of the vehicle, or route information;
  the method further comprising:
  determining, by the battery controller, a type of reduction in the driving distance according to a type of energy consumption of the battery;
  analyzing, by the driving controller, a route for each slope type using the obtained route information; and
  determining, by the driving controller, a type of route in a situation in which the driving distance decreases.

13. The method of claim 12, further comprising monitoring, by the battery controller, a state of charge (SoC) of the battery, a state of health (SoH) of the battery, and a state of power of the battery.

* * * * *